Dec. 5, 1967  O. W. OHLSSON  3,356,977
APPARATUS FOR MEASURING OR INDICATING PHYSICAL QUANTITIES
Filed June 17, 1965
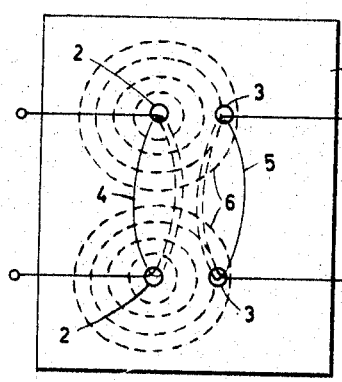
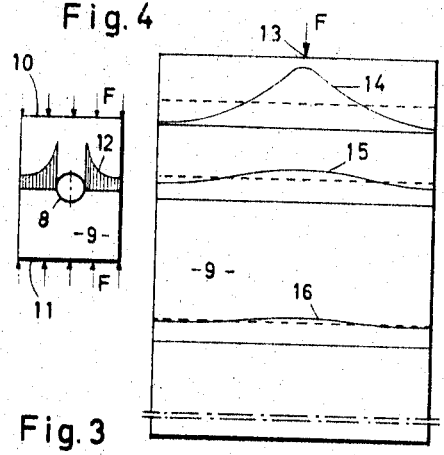
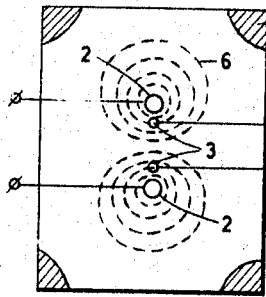
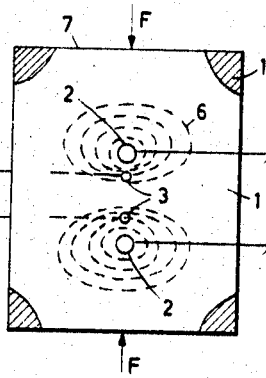
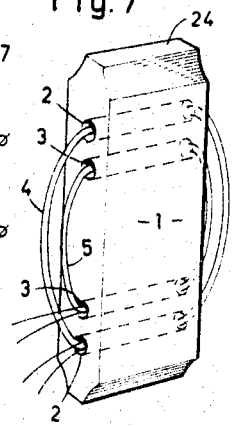
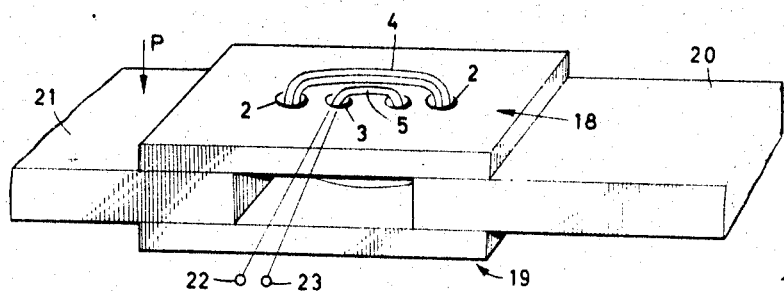
INVENTOR.
Olof Werner Ohlsson
BY
Cushman, Darby & Cushman

# United States Patent Office 3,356,977
Patented Dec. 5, 1967

3,356,977
APPARATUS FOR MEASURING OR INDICATING PHYSICAL QUANTITIES
Olof W. Ohlsson, Jonkoping, Sweden, assignor to Industrilaboratoriet Aktiebolag, Jonkoping, Sweden
Filed June 17, 1965, Ser. No. 464,730
Claims priority, application Sweden, June 23, 1964, 7,611/64
5 Claims. (Cl. 336—20)

ABSTRACT OF THE DISCLOSURE

Apparatus for measuring physical quantities, utilizing the magnetostrictive effect, by stressing mechanically a body of ferromagnetic material having a magnetizing winding surrounding part of the body and having a measuring winding coplanar with the magnetizing winding and surrounding material of the body located within the magnetizing winding. The magnetizing winding is electrically excited whereby the current induced in the measuring winding is linearly proportional to the mechanical stress on the body.

---

Swedish patent specification No. 180,348 describes an apparatus for measuring physical quantities, utilizing the magnetostriction effect, that is, the property of a piece of iron that when it is subjected to a compressive force the permeability decreases in the direction of the force and increases at right angles to the force, while under tensile stress the position is reversed. The known apparatus comprises at least one transmitter consisting of a measuring body of magnetic material, which is designed to be subjected to a mechanical load dependent on the said quantity, at least one magnetizing winding partly surrounding the measuring body, and at least one measuring winding. These windings are designed to be connected to a source of voltage and to a measuring instrument respectively, the magnetizing and measuring windings being spaced at some distance apart from one another, and a part of the magnetizing winding at least, extending from one surface to a surface turned away from this of the measuring body, being separated during measurement from the measuring winding by a magnetic substance surrounding this winding zone, so that a substantial part, dependent on the mechanical loading of the measuring body, of the magnetic flux induced by the magnetizing winding in the measuring body, circulates through the said substance outside the measuring winding without passing to this, as simultaneously another essential part of the said flux circulates through the measuring winding.

FIGURE 1 in the accompanying drawings shows an apparatus of a kind consisting of a measuring body 1, which is formed from one or more plates of magnetic material placed one upon the other, and formed with four holes 2 and 3 in such a way that they form the corners of a rectangle. Through the superimposed holes 2 is drawn a magnetizing winding 4 and through the holes 3 placed to the right of the holes 2 is drawn a measuring winding 5. The latter is thus placed adjacent to and at a certain distance from the magnetizing winding 4. If the magnetizing winding 4 is connected to a source of alternating current, then there is obtained in the measuring body a magnetic field, part of whose lines of force extend through the measuring winding and the other part outside this. If the measuring body is now mechanically loaded the lines of forces 6 through the measuring body are deformed because of the magnetostriction effect, so that they assume a more elliptical form, so that now a different number of lines of force pass through the measuring winding than was the case with the unloaded measuring body. The electromotive force induced in the measuring winding is thus altered, which alteration represents a measure for the alteration in load.

The magnetizing and measuring windings are here placed in succession in separate planes and at a certain distance apart, so that the measuring winding is only affected by peripheral sections of the lines of force on one side of the magnetizing winding. Geometrically considered, the two windings each surround their part of the material in the measuring body, so that the measuring apparatus has only a comparatively moderate sensitivity.

A considerably more sensitive measuring apparatus is obtained, which can be given reduced dimensions under the circumstances when, in accordance with the invention, are arranged in such a way that one winding at least partly surrounds the magnetic material located inside the other.

The invention will be described in greater detail by way of example with reference to FIGURES 2 to 7 of the accompanying drawing, in which:

FIGURES 2 and 3 are plan views of a measuring apparatus embodying the invention in the unloaded and loaded condition respectively, FIGURE 4 shows the effect which a hole in a body has on the distribution of the stress due to a mechanical loading along a cross-section of the body, FIGURE 5 shows the stress distribution in various cross-sections of a body from a load applied centrally against one body surface, FIGURE 6 shows an example of a measuring apparatus with two transmitters arranged in accordance with the invention, in perspective, and FIGURE 7 shows a bar-shaped transmitter embodying the invention, in perspective.

The transmitter shown in FIGURES 2 and 3 differs from the known transmitter represented in FIGURE 1 in that the holes 3 for the measuring winding 5 are placed in the zone between the holes 2 for the magnetizing winding 4, the two windings coming to lie substantially in one and the same winding plane, the measuring winding at least partly surrounding the material of the measuring body 1 present inside the magnetizing winding 4.

Due to this arrangement of the windings several essential advantages are obtained. As can be seen more clearly from a comparison between FIGURE 1 and FIGURES 2 and 3, in the latter case the measuring winding lies inside the central part of the lines of force 6, by which the measuring winding permits a greater inductive electromotive force. In the arrangement shown in FIGURES 2 and 3 of the holes 2 and 3 near the central part of the measuring body the lines of force come to lie closer together in the zone of the measuring body, where the holes 3 of the measuring winding are placed. If now the measuring body is acted on by a mechanical force F against two oppositely facing surfaces 7 of the measuring body parallel to the winding plane, as shown in FIGURE 3, the lines of force are forced to a considerable extent from the centre of the measuring body, so that the number of lines of force passing through the measuring winding in considerably reduced. This results in a considerable alteration in the electromotive force induced in the measuring winding, whereby the transmitter receives a considerable sensitivity. The sensitivity is greater when the two windings are so arranged that their magnetization axes coincide.

A further factor of importance is represented in FIGURE 4. A hole 8 in a body 9 subjected to mechanical loading, for example, pressure F against two oppositely facing surfaces 10 and 11 of a measuring body embodying the invention, causes a break in the mechanical transmission of force between the said surfaces, whereby stress is distributed in a cross-section at right angles to the direction of force through the hole in such a way that the stress in the vicinity of the hole is considerably greater and often about three times as great as that further from the hole. This is shown by the diagram 12 in FIGURE 4. In the winding plane at right angles to the said cross-section, there are found in the material tensile stresses extending to the holes. This helps to produce a further deformation of the lines of force under mechanical load and hence an increase in the sensitivity of the transmitter.

In order to obtain according to circumstances substantially the same distribution of the stress in measuring bodies of transmitters of this kind, it is best for the force to be applied to the measuring body comparatively centrally against the surfaces subjected to the load. The stress distribution thus obtained in different cross-sections of the body is represented in FIGURE 5, where a compressive force applied centrally against the body 9 is indicated by an arrow F. In a cross-section directly below the point of application 13 there is thus obtained a stress distribution corresponding to the diagram 14 and where the stress has a marked maximum below the point 13. The farther removed from the point 13 the flatter the stress curve, as is clear from the graphs 15 and 16.

The arrangement in accordance with the invention offers the possibility of arranging the holes 2 and 3 in the zones of the measuring body 1 where the stress curve has a more or less pronounced maximum, which further increases the sensitivity of the transmitter under variations in load. The above-mentioned hole effect of the holes of the two windings then comes into play to this effect.

The stress distribution shown in FIGURE 5 in the vicinity of the relevant application point 13 of the load is more certainly obtained if the load is applied against reduced surfaces of the measuring body 1, as is represented by the sectioned shaded parts 17.

Because of the high responsiveness of the new transmitter, five to ten times greater than in the case of the known transmitter in FIGURE 1, possible variations in temperature of the apparatus affect the size of the initial values only to a slight extent.

FIGURE 6 shows a measuring apparatus which is associated with two transmitters 18 and 19 embodying the invention. The transmitters are fixed by one end of their measuring bodies 1 by rivets, bonding or soldering in each case to one side of a fixed arm 20 and by the other ends to a free arm 21. If now the arm 21 is loaded with a downwardly directed force P, the measuring body of the upper transmitter 18 is subjected to a tensile stress and the measuring body of the lower transmitter 19 is subjected to a compressive stress. The measuring windings of the two transmitters are therefore so connected in series that via the common terminals 22 and 23 of the measuring windings zero voltage is obtained in the mechanically unloaded condition of the measuring body. With a load by the force P the values of the two measuring windings are algebraically subtracted from one another, the initial value of the terminals 22 and 23 completely corresponding to the variation in load.

FIGURE 7 shows a transmitter embodying the invention whose measuring body 1 is formed as a bar. In such a case the hole effect represented in FIGURE 4 and the stress distribution effect shown in FIGURE 5 occur even more powerfully. If in this case the end surfaces 24 of the bar acted on by mechanical load F are bevelled, there is obtained a further increase in the said effects with a subsequent considerably increased responsiveness.

The transmitter can be made completely symmetrical in respect of the winding plane, which is not possible with the known transmitter in FIGURE 1.

The transmitter can of course be varied within the scope of the following claims. Thus, in one form the outer winding can be used as a measuring winding and the inner winding as a magnetizing winding. A certain angle between the winding planes of the two windings can be tolerated, and one winding can likewise be displaced laterally by a slight amount in relation to the other winding.

What I claim is:

1. Apparatus for measuring physical quantities utilizing the magnetostriction effect, said apparatus comprising a body of ferromagnetic material to be subjected to mechanical stresses, at least one magnetizing winding surrounding a portion of the body and at least one measuring winding arranged so that a portion of the magnetic flux induced in said body by the magnetizing winding links the measuring winding, the winding planes of the magnetizing and measuring windings being so disposed as to substantially coincide, one of said windings surrounding a portion of the material of the body located inside the other of said windings.

2. An apparatus as in claim 1 wherein the magnetization axes of the windings coincide.

3. An apparatus as in claim 1, wherein the winding surrounding a portion of the material of the body located inside of the other of said windings is the measuring winding.

4. An apparatus as in claim 1, wherein said winding planes cut relatively small ranges of two contrarily directed end surfaces of said body to be subjected to mechanical loads during measurement.

5. An apparatus as in claim 4, wherein the said body is formed as a bar with contrarily directed end surfaces.

References Cited

UNITED STATES PATENTS

| | | | |
|---|---|---|---|
| 2,370,845 | 3/1945 | Davis | 324—34 |
| 1,586,877 | 6/1926 | Buckley | 336—20 X |
| 3,224,101 | 12/1965 | Ohlsson | 73—88.5 X |

MILTON O. HIRSHFIELD, *Primary Examiner.*

D. F. DUGGAN, *Assistant Examiner.*